W. Zeiger,
Potato Masher.
No. 88,111. Patented Mar. 23, 1869.
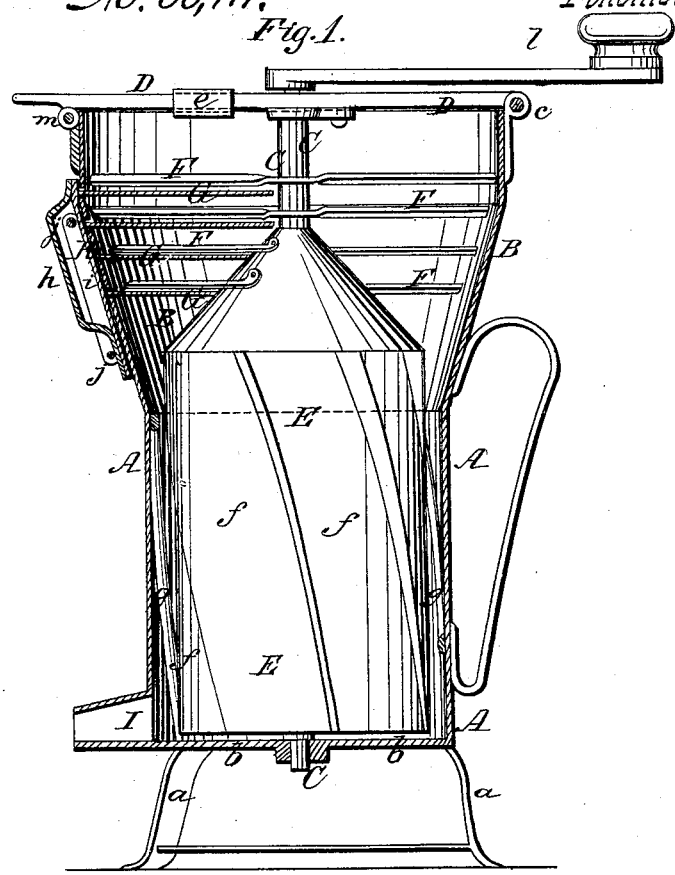
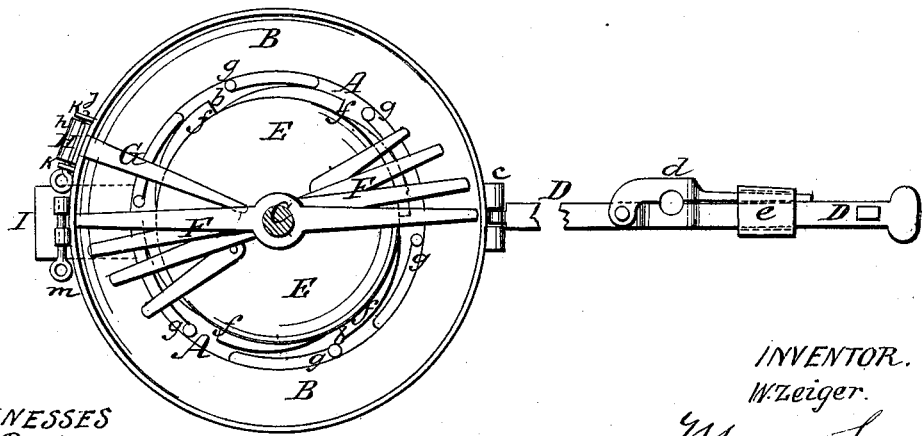
WITNESSES
Joh. Becker
Wm A Morgan
INVENTOR
W. Zeiger
pr. Munn & Co
Attys

United States Patent Office.

WILLIAM ZEIGER, OF ELMORE, OHIO.

*Letters Patent No. 88,111, dated March 23, 1869.*

IMPROVED POTATO-MASHER.

The Schedule referred to in these Letters Patent and making part of the same.

*To all whom it may concern:*

Be it known that I, WILLIAM ZEIGER, of Elmore, in the county of Ottawa, and State of Ohio, have invented a new and improved Potato-Masher; and I do hereby declare that the following is a full, clear, and exact description thereof, which will enable others skilled in the art to make and use the same, reference being had to the accompanying drawings, forming part of this specification, in which—

Figure 1 represents a sectional elevation of my improved potato-masher.

Figure 2 is a plan or top view of the same.

Similar letters of reference indicate corresponding parts.

This invention relates to a new device for mashing boiled potatoes, so that the same will be thoroughly and properly transformed into a pasty substance, without any difficulty or inconvenience.

The apparatus is a cylindrical shell, with a hopper-shaped upper end. A grinder is arranged within the cylinder, carrying cutters in the hopper, stationary cutters being arranged in the latter. As the grinder is turned, the potatoes will be cut into small pieces in the upper, and ground or mashed in the lower part of the vessel, so as to be discharged, through a proper spout, in the desired state. The stationary cutters are made removable, so that the whole apparatus can be taken apart for cleaning-purposes.

A, in the drawing, represents a cylinder, made of sheet-metal, or other suitable material, of suitable size. It is set upright, on suitable supports, $a\ a$, or otherwise supported in a vertical position. Its lower end is closed by means of a bottom plate, $b$, while it is open on top. To the upper end of the cylinder is secured, or on it is formed an inverted conical vessel or hopper, B, as shown.

C is a vertical shaft, arranged concentrically, within the cylinder and hopper, its lower end being supported on the bottom, $b$, while its upper end is fitted through a cross-bar, D, that is hinged to the upper part of the hopper, as shown at $c$, in fig. 1.

The cross-bar has a hinged part, $d$, (as in fig. 2,) which is locked by a sliding sleeve, $e$, but which can be swung aside to liberate the shaft when it is desired to remove the same. The cross-bar can also be swung open, as in fig. 2, and is locked, when closed, by a pin, $m$.

On the shaft C is mounted a drum, E, which has a cross-section, similar to the face of a ratchet-wheel, the teeth $f\ f$ running spiral, as in fig. 1.

Spiral ribs, G G, are arranged on the inner side of the cylinder.

On the upper part of the drum, or shaft is arranged a series of radiating curves, F F, as shown.

G G are some knives, fastened to a narrow plate, H, which is provided with a handle, $h$, and with flanges, $i\ i$, at its sides, as shown.

This plate is placed against the outside of the hopper, the knives G fitting through slots arranged in the latter, and then the plate is locked by means of pins $j\ j$, fitted through ears, $k$, projecting from the hopper, and through the flanges $i$, as is clearly shown in the drawing.

I is a spout, or opening, arranged in the lower part of the opening.

When, by means of a crank, $l$, or otherwise, rotary motion is imparted to the shaft C, the cutters F are also carried round, and will, in conjunction with the knives G, serve to cut potatoes, that are placed in the hopper, into small pieces, which pieces are then, between the eccentric faces of the drum and the ribs of the cylinder, mashed into a paste, in which no lumps will remain.

When the apparatus is to be taken apart, the plate H is first removed, with its knives, by drawing out the pins $j$. Then the pin $m$ is drawn out, and the slide $e$ drawn back, so that the cross-bar can be swung out. The shaft, with its appendages, can then be taken out, and all parts thoroughly cleaned.

Having thus described my invention,

I claim as new, and desire to secure by Letters Patent—

1. A potato-masher, consisting of the cutting-apparatus B F G, and of the grinding-mill A E, all arranged and operating substantially as herein shown and described.

2. Attaching the fixed cutters G to a plate, H, which is fastened to the hopper B, so that the cutters are fitted through slots in the side of the same, substantially as herein shown and described.

WILLIAM ZEIGER.

Witnesses:
WM. CALDWELL,
G. ZEIGER.